United States Patent
Bandholz et al.

(10) Patent No.: US 8,560,868 B2
(45) Date of Patent: Oct. 15, 2013

(54) REDUCING SUBSYSTEM ENERGY COSTS

(75) Inventors: Justin Potok Bandholz, Cary, NC (US); William Gabriel Pagan, Durham, NC (US); William Joseph Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 12/559,121

(22) Filed: Sep. 14, 2009

(65) Prior Publication Data
US 2011/0066840 A1   Mar. 17, 2011

(51) Int. Cl.
*G06F 1/32* (2006.01)
*G06F 9/46* (2006.01)

(52) U.S. Cl.
USPC .......................................... 713/320; 718/104

(58) Field of Classification Search
USPC .............. 713/300, 320, 324, 340; 718/1, 100, 718/104
See application file for complete search history.

(56) References Cited

U.S. PATENT DOCUMENTS

| | | | |
|---|---|---|---|
| 7,058,826 B2 | 6/2006 | Fung | |
| 7,484,111 B2 | 1/2009 | Fung | |
| 2003/0056126 A1* | 3/2003 | O'Connor et al. | 713/300 |
| 2004/0111596 A1 | 6/2004 | Rawson, III | |
| 2006/0101290 A1* | 5/2006 | Ma | 713/300 |
| 2006/0184287 A1* | 8/2006 | Belady et al. | 700/291 |
| 2008/0104430 A1 | 5/2008 | Malone et al. | |
| 2008/0104601 A1* | 5/2008 | Kaneko et al. | 718/103 |
| 2008/0184250 A1* | 7/2008 | Hamadi et al. | 718/104 |
| 2009/0044036 A1 | 2/2009 | Merkin | |

* cited by examiner

*Primary Examiner* — Chun Cao
(74) *Attorney, Agent, or Firm* — Yee & Associates, P.C.; Tom Tyson (57) ABSTRACT

Power supply to system resources is managed by implementing a hardware hook. System resources that should be reconfigured for an application workload are identified. A present power profile in a non-volatile memory is then updated. The present power profile is updated according to the application workload. During a system restart, the present power profile is retrieved from the non-volatile memory. Power is applied to system resources through the hardware hook based on the present power profile.

24 Claims, 5 Drawing Sheets

REDUCING SUBSYSTEM ENERGY COSTS

BACKGROUND

1. Field

The disclosure relates generally to computer implemented methods, data processing systems, and tangible computer storage media having computer executable instructions encoded thereon. More specifically, the disclosure relates to tangible computer storage media having computer executable instructions encoded thereon for reducing subsystem energy costs in a data processing system.

2. Description of the Related Art

Increasingly, large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platform resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from each other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocable resources within the platform.

With respect to hardware resources in a logical partitioned data processing system, these resources are shared dis-jointly among various partitions. These resources may include, for example, input/output (I/O) adapters, memory DIMMs, non-volatile random access memory (NVRAM), and hard disk drives. Each partition within a logical partitioned data processing system may be booted and shut down over and over without having to power-cycle the entire data processing system.

A server configuration typically includes a number of subsystems and components that are not used for every specific application run on the server. For example, a basic server configuration may include excess memory DIMMs, multiple CPUS, and NIC ports that are needed for some applications but not needed for others. In some cases, a server may never use some of the hardware resources provided on that a server.

SUMMARY

According to one embodiment of the present invention, power supply to system resources is managed by implementing a hardware hook. System resources that should be reconfigured for an application workload are identified. A present power profile in a non-volatile memory is then updated. The present power profile is updated according to the application workload. During a system restart, the present power profile is retrieved from the non-volatile memory. Power is applied to system resources through the hardware hook based on the present power profile.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
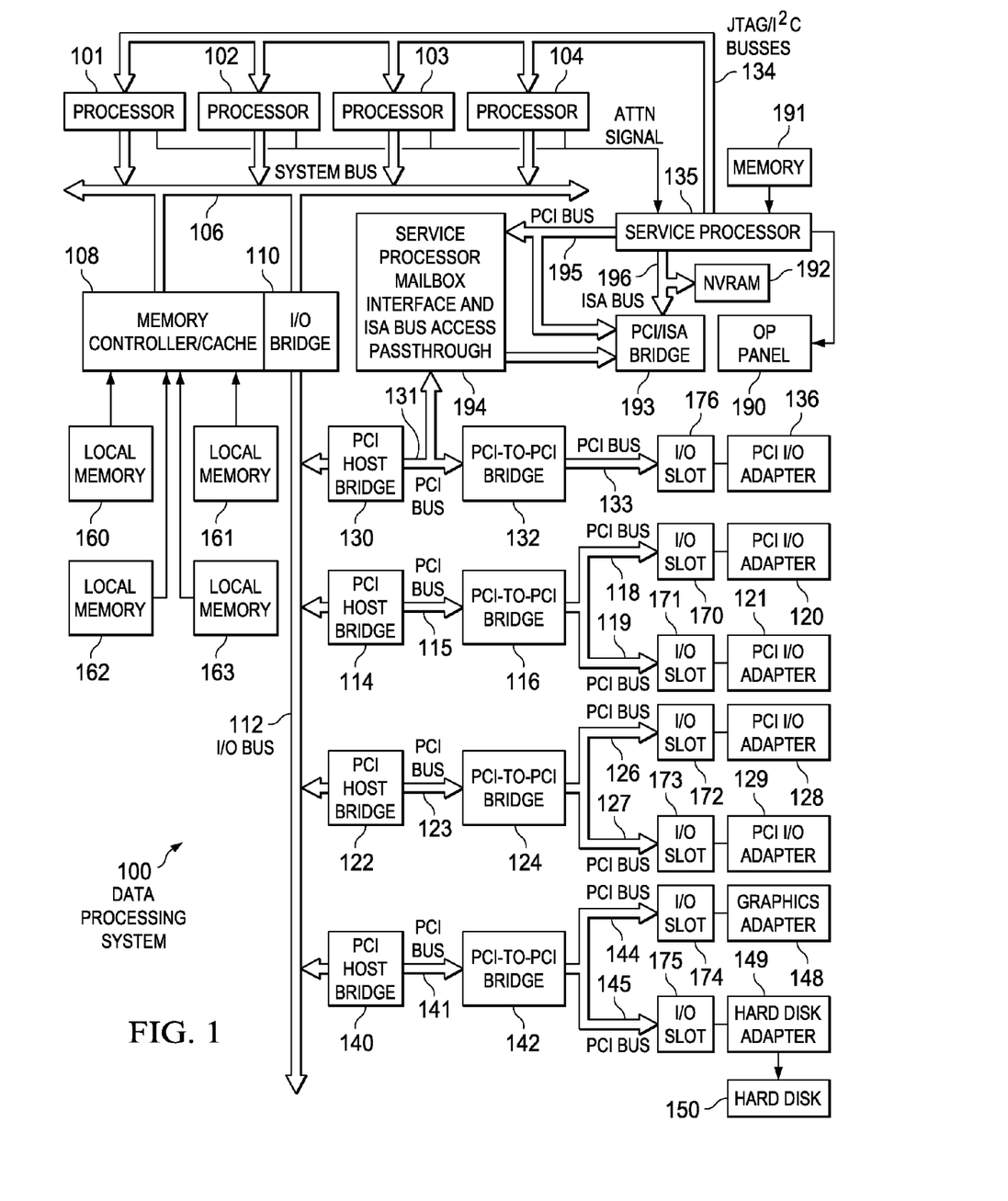
FIG. 1 is a block diagram of a data processing system in which illustrative embodiments may be implemented.

With reference now to the figures, and in particular with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129, may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-

129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to, or in place of, the hardware depicted. The depicted example is not meant to imply architectural limitations with respect to illustrative embodiments.

Figure 2:
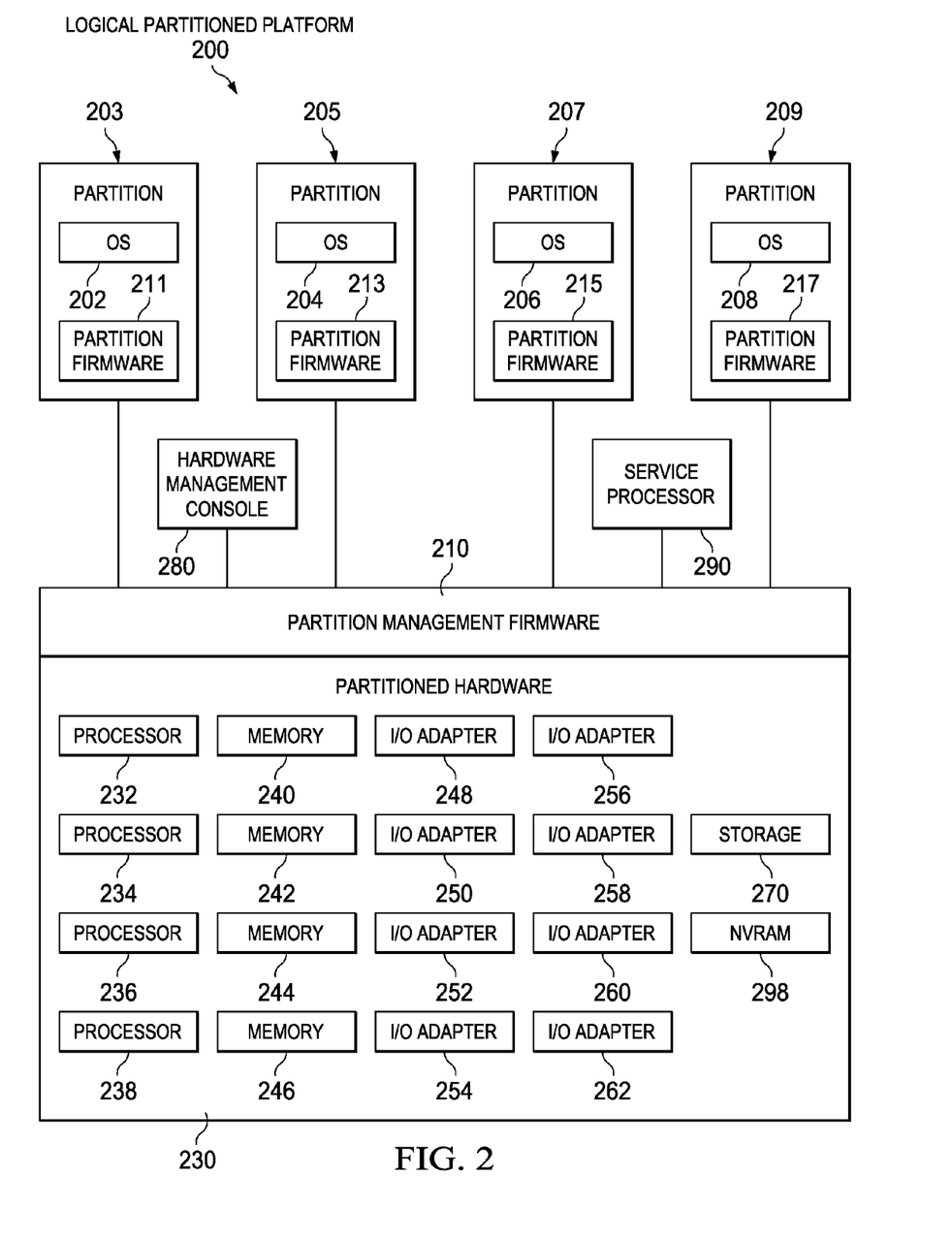
FIG. 2 is a block diagram of an exemplary logical partitioned platform in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and Non-volatile random access memory (Non-volatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Energy costs for the server can be reduced if hardware mechanisms are provided to allow power to be removed from the unused subsystems AND if software (such as the operating system) allows the subsystem to be taken out of service without impacting the operation of the system. Unfortunately, with the exception of some "hotplug" subsystems, many operating systems will not recognize that resources may be removed from the system and therefore it is difficult to reduce the energy cost associated with unused subsystem.

The illustrative embodiments described herein provide a technique that allows a power profile for a data processing system to be reconfigured for a specific application. During execution of the application, the data processing system runs at the optimized energy cost. The data processing system runs at that optimized energy cost until the data processing system is automatically reconfigured by another application.

Hardware hooks are provided within the data processing system that allow power to be applied to and removed from specific hardware elements, subsystems and devices. Control software is provided that allows an application program running under the operating system to communicate configuration parameters to the hardware hook. Configuration parameters are stored until the next restart of the system. These parameters specify which hardware elements are required to be powered on and which should be powered off.

Provided Power-on Self-Test Software and Basic Input Output Software (POST/BIOS) applies or removes power to specific hardware elements as indicated in the configuration parameters that have been stored by a previously running application program. These capabilities allow the data processing system to experience a reduction of server power.

Figure 3:
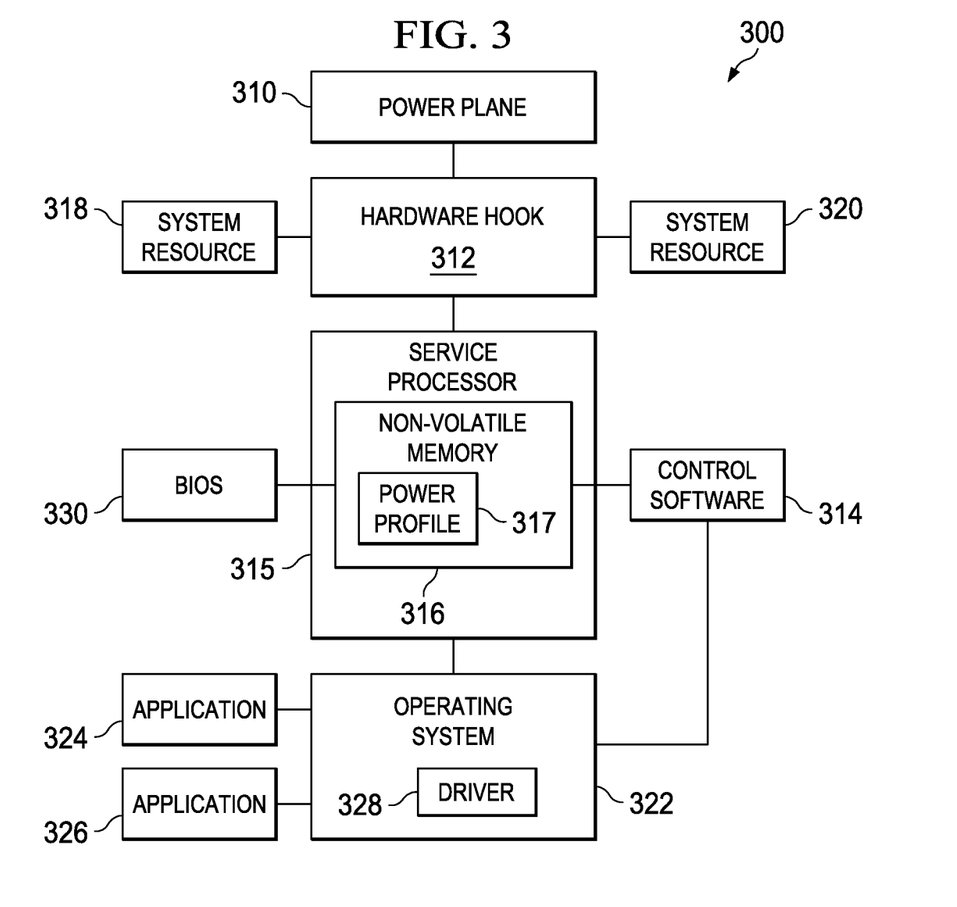
FIG. 3 is a data flow diagram for automatic power configuration of devices within a server according to an illustrative embodiment.

Referring now to FIG. 3, a data flow diagram for automatic power configuration of devices within a server is shown according to an illustrative embodiment. Data processing system 300 may be implemented using a data processing system, such as data processing system 100 of FIG. 1.

Power to each component of data processing system 300 is provided from power plane 310 of a printed circuit board via hardware hook 312. Hardware hook 312 is connected to power plane 310 via a power converter or transistor, such as, but not limited to, a DC to DC regulator, a bipolar (junction) transistor (BJT), and a field effect transistor.

Hardware hook 312 is a hardware device that has the ability to enable and disable power elements on the printed circuit board. Hardware hook 312 can be a hardware device, such as a microcontroller, a staggered pin grid array, an integrated circuit, or other piece of hardware.

Hardware hook 312 provides an interface between non-volatile memory 316 and system resources 318-320 of data processing system 300. System resources 318-320 are hardware devices connected to the data processing system requiring a power source provided from power plane 310. That is, system resources 318-320 require power provided from data processing system 310. System resources 318-320 typically do not have an independent power source apart from power plane 310 to provide operational power to system resources 318-320. System resources 318-320 can be, for example, but are not limited to, individual CPUs, individual NIC ports, dual inline memory modules, application specific integrated circuits, and hard disk drives. Hardware hook 312 isolates the power planes of system resources 318-320, provide a switching mechanism to apply or withhold voltages to the ones of system resources 318-320.

Non-volatile memory 316 provides a register which stores present power profile 317. Present power profile 317 designates the power states for system resources 318-320. Non-volatile memory 316 is a rewritable memory chip that retains data stored thereon when power to non-volatile memory 316 is switched off. Non-volatile memory 316 can be, for example, but is not limited to, erasable programmable read-only memory (EPROM), electrically erasable programmable read-only memory (EEPROM), FLASH memory, ferroelectric random access memory (FeRAM), magnetoresistive random access memory (MRAM), programmable metallization cells (CBRAM), and carbon nanotube memory.

In an illustrative embodiment, non-volatile memory 316 is implemented within service processor 315. Service processor 315 is a service processor, such as service processor 135 of FIG. 1.

While non-volatile memory 316 may be stored in some portion of battery-backed complementary metal-oxide-semiconductor (CMOS), or electrically erasable programmable read-only memory, in one illustrative embodiment non-volatile memory 316 is provided via a centralized datacenter manager.

Hardware hook 312 provides power to system resources 318-320 according to the register states as provided in non-volatile memory 316. That is, hardware hook 312 allows power from power plane 310 to pass to those ones of system resources 318-320 according to present power profile 317 stored in non-volatile memory 316. Non-volatile memory 316 provides a mechanism that allows software to control the power switches of hardware hook 312.

Control software 314 is a software application that can access and reconfigure present power profile 317 stored in non-volatile memory 316. By manipulating present power profile 317, control software 314 is able to set the power state of the data processing system independent from any operating system running on data processing system 300. Control software 314 is able to manipulate present power profile 317 independent of user interaction with the operating system. When power control is switched from operating system 322 to control software 314, the power state of data processing system 300 can be customized based on the particular power requirements of applications executing on the data processing system.

In an illustrative embodiment, control software 314 is control software such as IBM Director®. IBM Director® is a comprehensive systems manager that provides an integrated, easy-to-use suite of tools, with flexible systems-management abilities to help maximize system availability and lower informational technology costs.

In an illustrative embodiment, control software 314 can interact with non-volatile memory 316 via a system management interrupt. The system management interrupt provides an out of band mechanism to update the power states.

Operating system 322 is a software system that is responsible for the management and coordination of activities and the sharing of the resources of data processing system 300. Operating system 322 acts as a host for applications 324-326 executing on data processing system 300. Operating system 322 handles the details of the operation of hardware devices, such as system resources 318-320. Operating system's 322 handling of hardware devices relieves applications 324-326 from having to manage hardware operation details.

Operating system 322 includes power state driver 328. Power state driver 328 is software that communicates with non-volatile memory 316 via a peripheral component interconnect express bus, a frontside bus, or other communication subsystem connected to non-volatile memory 316. Power state driver 328 issues commands to hardware hook 312. While data processing system 300 is operating, operating system 322 communicates with the non-volatile memory 316, and not with hardware hook 312. BIOS 330 or other bootstrap code will communicate with hardware hook 312.

Power state driver 328 allows operating system 322 to directly access non-volatile memory 316. However, during automatic power configuration, power state driver 328 provides an interface to applications 324-326 running on data processing system 300 so that applications 324-326 can manipulate hardware hook 312 the present power profile 317 stored in non-volatile memory 316.

BIOS 330 is a boot firmware or software, designed to be the first code run by a data processing system 300 when powered on. The initial function of BIOS 330 is to identify, test, and initialize system devices such as the video display card, hard disk, floppy disk and other hardware, including system resources 318-320. BIOS 330 prepares the data processing system 300 for a known state, so that software stored on compatible media can be loaded and executed. This process is known as booting, or booting up, which is short for bootstrapping.

BIOS 330 includes a power-on, self-test. The power-on, self test (POST) is a pre-boot sequence undergone by the data processing system. The power-on, self-test can include actions, such as, for example, but not limited to, verifying the integrity of the BIOS code, finding, sizing, and verifying system main memory, discovering, initializing, and cataloging all system buses and devices, providing a user interface for system configuration, identifying, organizing, and selecting which devices are available for booting, and constructing whichever system environment that is required by the target operating system.

During execution of BIOS 330 and the power-on, self-test, BIOS 330 retrieves present power profile 317 from non-volatile memory 316. According to present power profile 317, BIOS 330 directs hardware hook 312 to apply or remove power to specific hardware elements, such as ones of system resources 318-320 as indicated in the present power profile 317 that has been stored by a previously running application program. Only those of system resources 318-320 specified by present power profile 317 are powered on.

Figure 4:
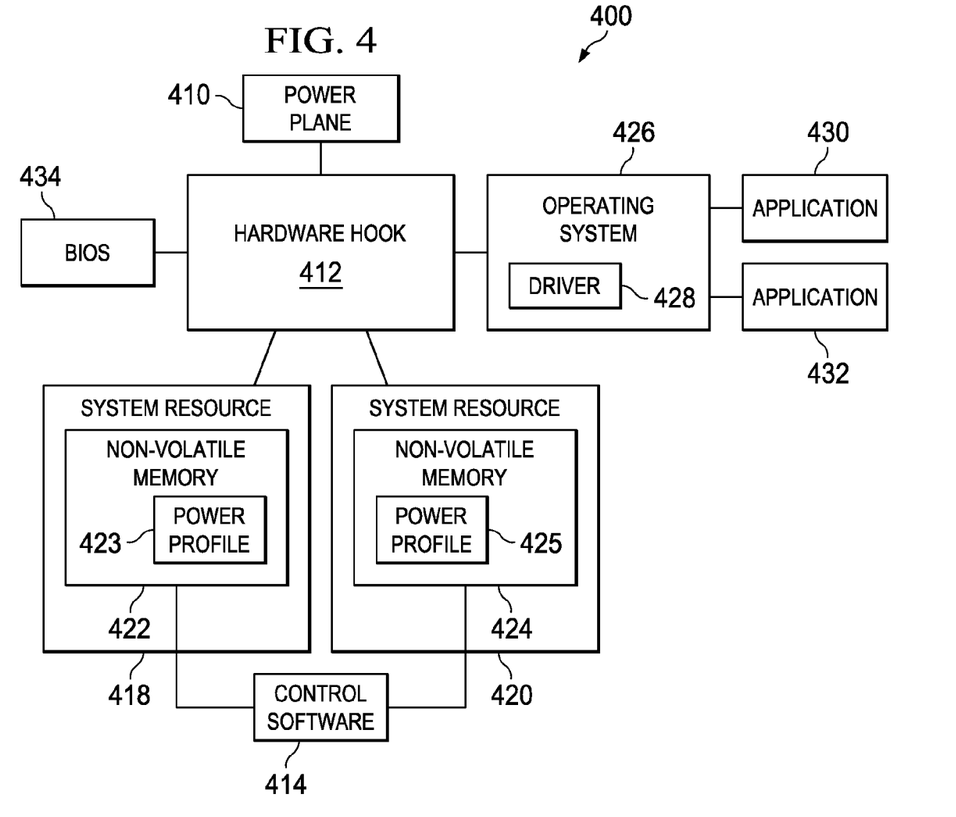
FIG. 4 is an alternative data flow diagram for automatic power configuration of devices within a data processing system according to an illustrative embodiment.

Referring now to FIG. 4, an alternative data flow diagram for automatic power configuration of devices within a data processing system is shown according to an illustrative embodiment. Data processing system 400 is a data processing system such as data processing system 100 of FIG. 1.

Power plane 410 is power plane 310 of FIG. 3. Hardware hook 412 is hardware hook 312 of FIG. 3. Control software 414 is control software 314 of FIG. 3.

System resources 418-420 are similar to system resources 318-320 of FIG. 3. However, each of system resources 418-420 is provided with its own non-volatile memory. System resource 418 includes non-volatile memory 422, and system resource 420 includes non-volatile memory 424.

Non-volatile memory 422-424 provide system resources 418-420 a register which stores power profiles 423 and 425 personal to that device. That is, non-volatile memory 422 stores power profile 423 for system resource 418 and non-volatile memory 424 stores power profile 425 for system resource 420. Non-volatile memory 422-424 are rewritable memory chips that retains data stored thereon when power to non-volatile memory 422-424 is switched off. Non-volatile memory 422-424 can be, for example, but is not limited to, erasable programmable read-only memory (EPROM), electrically erasable programmable read-only memory (EEPROM), FLASH memory, ferroelectric random access memory (FeRAM), magnetoresistive random access memory (MRAM), programmable metallization cells (CBRAM), and carbon nanotube memory.

Operating system 426 and control software 414 can access non-volatile memory 422-424 via power state driver 428 and hardware hook 412. During automatic power configuration, power state driver 428 provides an interface to applications 430-432 running on data processing system 400 so that applications 430-432 can manipulate hardware hook 412 via the power profiles stored in non-volatile memory 422-424.

During execution of BIOS 434 and the power-on, self-test, BIOS 434 retrieves power profiles 423 and 425 from non-volatile memory 422-424. BIOS 434 directs hardware hook 412 to apply or remove power to specific hardware elements, such as ones of system resources 418-420 as indicated by the power profile personal to that device. That is, BIOS 434 directs hardware hook 412 to apply or remove power to system resource 418 according to power profile 423 stored in non-volatile memory 422. BIOS 434 directs hardware hook 412 to apply or remove power to system resource 420 according to power profile 425 stored in non-volatile memory 424.

The illustration of data processing system 300 in FIG. 3 and data processing system 400 in FIG. 4 are not meant to imply physical or architectural limitations to the manner in which different advantageous embodiments may be implemented. Other components in addition to, and/or in place of, the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
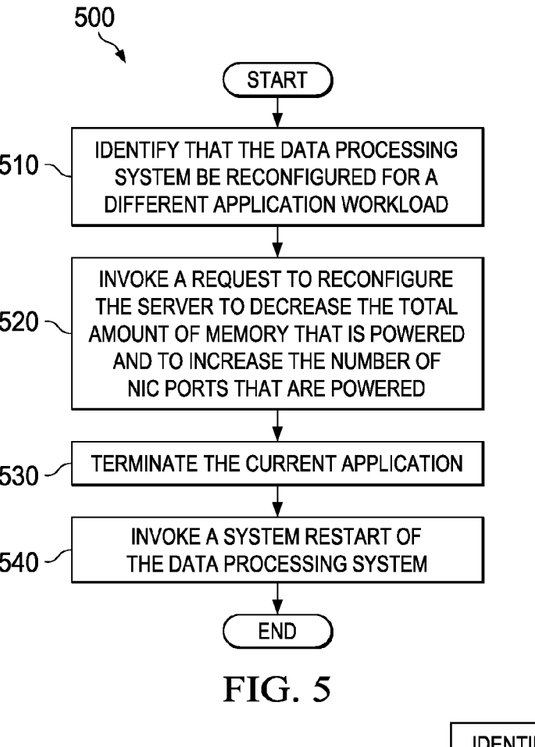
FIG. 5 is a flowchart of a process for automatically configuring power profiles of devices within a data processing system according to an illustrative embodiment.

Referring now to FIG. 5, a flowchart of a process for automatically configuring power profiles of devices within a data processing system is shown according to an illustrative embodiment. Process 500 is a process executing on a data processing system, such as data processing system 300 of FIG. 3.

Process 500 begins by identifying that the data processing system should be reconfigured for a different application workload (step 510). Initially, the data processing system is configured for a specific application workload requiring some specific set of resources. The specific set of resources include usage of attached devices, such as system resources 318-320 of FIG. 3. Originally, the application requiring the specific application workload can be, for example, a database application requiring configuration of the data processing system as a database server. The specific set of resources required by the specific application workload can include, for example, as a large amount of memory, but relatively few network interface card ports.

Process 500 can identify that the data processing system should be reconfigured based upon, for example, but not limited to, the time of day, traffic levels, CPU usage, or other criteria. Based on identifying that the data processing system should be reconfigured, the data processing system will cease to be utilized for the first application, i.e., the database application. The data processing system will instead be utilized by some second application requiring a potentially different set of resources. For example, it may be desirable to reconfigure the data processing system to run a backup application. The backup application requires a different specific application workload and a different configuration than did the database application. For example, the backup application may require less memory, but a larger number of network interface cards than did the database application.

Process 500 then invokes a request to reconfigure the server to decrease the total amount of memory that is powered and to increase the number of NIC ports that are powered (step 520). The reconfiguration is stored as a present power profile in non-volatile memory, such as non-volatile memory 316 of FIG. 3. The request is based on parameters specific to the application-to-be-run, for example, the backup application. The request can be invoked by the application-to-be-run via a command line interface or some other set of software application program interface. The request, and the subsequent change to the power profile, results in no immediate change to the data processing configuration. However, the parameters to configure the data processing system according to the specific application workload for the application-to-be-run are stored for use by POST/BIOS during the next restart of the data processing system.

Process 500 then terminates the current application (step 530), and invokes a system restart of the data processing system (step 540). Process 500 terminates thereafter.

Figure 6:
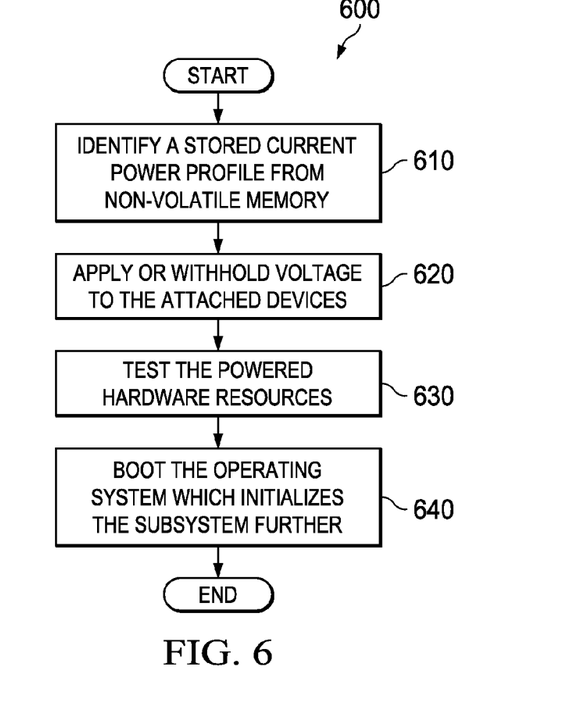
FIG. 6 is a flowchart of a process for starting a data processing system according to a saved power profile according to an illustrative embodiment.

Referring now to FIG. 6, is a flowchart of a process for starting data processing system according to a saved power profile is shown according to an illustrative embodiment. Process 600 is a software process, executing on a software component, such as BIOS 330 of FIG. 3.

During a restart, process 600 identifies a stored present power profile from non-volatile memory (step 610). The present power profile designates the power states for devices attached to the data processing system based on a specific application workload for the application that is to be executed.

Based on the identified present power profile, process 600 then applies or withholds voltage to the attached devices (step 620). In an illustrative embodiment, process 600 applies or withholds voltage to the attached devices by setting control bits in a hardware hook, such as hardware hook 312 of FIG. 3. The control bits enable power field effect transistor or similar circuitry to route or deny power to one or more power planes for the attached devices. In the above example, when transitioning from the database application to the backup application, process 600 removes power from some number of memory DIMMs as requested by the stored parameters and provides power to some set of network interface card ports.

Process 600 then tests the powered hardware resources (step 630), and then boots the operating system, which initializes the subsystems further (step 640). Process 600 terminates thereafter. Control software can then invoke the backup application on the data processing system according to the optimized power parameters.

Thus, the illustrative embodiments described herein provide a technique that allows a power profile for a data processing system to be reconfigured for a specific application. During execution of the application, the data processing system runs at the optimized energy cost. The data processing system runs at that optimized energy cost until the data processing system is automatically reconfigured by another application.

Hardware hooks are provided within the data processing system that allow power to be applied to, and removed from, specific hardware elements, subsystems and devices. Control software is provided that allows an application program running under the operating system to communicate configuration parameters to the hardware hook. Configuration parameters are stored until the next restart of the system. These parameters specify which hardware elements are required to be powered on and which should be powered off.

Provided Power-on Self-Test Software and Basic Input Output Software (POST/BIOS) applies or removes power to specific hardware elements as indicated in the configuration parameters that have been stored by a previously running application program. These capabilities allow the data processing system to experience a reduction of server power The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing power supply to system resources, the computer implemented method comprising:

identifying an application to be executed after a system restart;

identifying system resources for reconfiguration for a different application workload of the application to be executed after the system restart;

retrieving a power profile for the application to be executed after the system restart, wherein the power profile for the application to be executed after the system restart is an optimized energy specifying which hardware elements are required to be powered on and which hardware elements should be powered off for execution of the application to be executed after the system restart;

responsive to identifying system resources for reconfiguration, updating a present power profile in a non-volatile memory to correspond to the power profile for the application to be executed, wherein the present power profile is updated according to the different application workload;

during the system restart, retrieving the present power profile in the non-volatile memory; and applying power to system resources through a hardware hook based on the present power profile.

2. The computer implemented method of claim 1 further comprising:

identifying system resources for reconfiguration for the different application workload, wherein the system resources include resources selected from a group consisting of processing units, network interface card ports, dual inline memory modules, application specific integrated circuits, hard disk drives, and combinations thereof.

3. The computer implemented method of claim 1, wherein the application workload is provided by the application to be executed after the system restart, and wherein the present power profile is updated via a system management interrupt.

4. The computer implemented method of claim 1 further comprising:

during the system restart, executing a basic input/output software;

retrieving by the basic input/output software the present power profile in the non-volatile memory; and applying by the basic input/output software power to the system resources through the hardware hook based on the present power profile, wherein the basic input/output software applies power to the system resources by setting a set of control bits in the hardware hook.

5. The computer implemented method of claim 1, wherein the step of updating the present power profile in the non-volatile memory further comprises:

updating the present power profile in the non-volatile memory, wherein the non-volatile memory is selected from a group consisting of erasable programmable read-only memory, electrically erasable programmable read-only memory, FLASH memory, ferroelectric random access memory, magnetoresistive random access memory, programmable metallization cells, carbon nanotube memory, and combinations thereof.

6. The computer implemented method of claim 1, further comprising:

issuing a system management interrupt by a control software; and responsive to issuing the system management interrupt, updating the present power profile in the non-volatile memory to correspond to the power profile for the application to be executed.

7. The computer implemented method of claim 6, wherein the step of issuing the system management interrupt by the control software further comprises:

issuing the system management interrupt by the control software, wherein the control software is the application to be executed after the system restart.

8. The computer implemented method of claim 1, wherein the step of applying power to the system resources through a hardware hook based on the present power profile further comprises:
applying power to the system resources through the hardware hook based on the present power profile, wherein the hardware hook is selected from a group consisting of a microcontroller, a staggered pin grid array, and an integrated circuit.

9. A tangible computer-readable storage device having computer readable program code stored thereon configured to manage power supply to system resources, the computer readable program code comprising:
instructions for identifying an application to be executed after a system restart;
instructions for identifying system resources for reconfiguration for a different application workload of the application to be executed after the system restart;
instructions for retrieving a power profile for the application to be executed after the system restart, wherein the power profile for the application to be executed after the system restart is an optimized energy specifying which hardware elements are required to be powered on and which hardware elements should be powered off for execution of the application to be executed after the system restart;
instructions, responsive to identifying the system resources for reconfiguration for the different application workload, for updating a present power profile in a non-volatile memory, wherein the present power profile is updated according to the application workload;
instructions, during the system restart, retrieving the present power profile in the non-volatile memory; and
instructions for applying power to system resources through a hardware hook based on the present power profile.

10. The tangible computer-readable storage device of claim 9, the computer readable program code further comprising:
instructions for identifying that the system resources for reconfiguration for the different application workload, wherein the system resources include resources selected from a group consisting of processing units, network interface card ports, dual inline memory modules, application specific integrated circuits, hard disk drives, and combinations thereof.

11. The tangible computer-readable storage device of claim 9, wherein the application workload is provided by the application to be executed after the system restart, and wherein the present power profile is updated via a system management interrupt.

12. The tangible computer-readable storage device of claim 9, the computer readable program code further comprising:
instructions, during the system restart, for executing a basic input/output software;
instructions for retrieving by the basic input/output software the present power profile in the non-volatile memory; and
instructions for applying by the basic input/output software power to the system resources through the hardware hook based on the present power profile, wherein the basic input/output software applies power to the system resources by setting a set of control bits in the hardware hook.

13. The tangible computer-readable storage device of claim 9, wherein the instructions for updating the present power profile in the non-volatile memory further comprises:
instructions for updating the present power profile in the non-volatile memory, wherein the non-volatile memory is selected from a group consisting of erasable programmable read-only memory, electrically erasable programmable read-only memory, FLASH memory, ferroelectric random access memory, magnetoresistive random access memory, programmable metallization cells, carbon nanotube memory, and combinations thereof.

14. The tangible computer-readable storage device of claim 9, the computer readable program code further comprising:
instructions for issuing a system management interrupt by a control software; and
instructions, responsive to issuing the system management interrupt, for updating the present power profile in the non-volatile memory to correspond to the power profile for the application to be executed.

15. The tangible computer-readable storage device of claim 14, wherein the instructions for issuing the system management interrupt by the control software further comprises:
instructions for issuing the system management interrupt by the control software, wherein the control software is the application to be executed after the system restart.

16. The tangible computer-readable storage device of claim 9, wherein the instructions for applying power to the system resources through the hardware hook based on the present power profile further comprises:
instructions for applying power to the system resources through the hardware hook based on the present power profile, wherein the hardware hook is selected from a group consisting of a microcontroller, a staggered pin grid array, and an integrated circuit.

17. A data processing system comprising:
a bus system;
a storage device having computer readable program code stored thereon configured to manage power supply to system resources;
a hardware hook; and
a processor, wherein the processor executes the computer readable program code to identify an application to be executed after a system restart; to identify system resources for reconfiguration for a different application workload of the application to be executed after the system restart; to retrieve a power profile for the application to be executed after the system restart, wherein the power profile for the application to be executed after the system restart is an optimized energy specifying which hardware elements are required to be powered on and which hardware elements should be powered off for execution of the application to be executed after the system restart; responsive to identifying system resources for reconfiguration for the different application workload, to update a present power profile in a non-volatile memory, wherein the present power profile is updated according to the application workload; during the system restart, to retrieve the present power profile in the non-volatile memory; and to apply power to system resources through a hardware hook based on the present power profile.

18. The data processing system of claim 17, wherein the processor further executes the computer readable program code:
to identify system resources for reconfiguration for the different application workload, wherein the system resources include resources selected from a group consisting of processing units, network interface card ports, dual inline memory modules, application specific integrated circuits, hard disk drives, and combinations thereof.

19. The data processing system of claim 17, wherein the application workload is provided by the application to be executed after the system restart, and wherein the present power profile is updated via a system management interrupt.

20. The data processing system of claim 17, wherein the processor further executes the computer readable program code:
during the system restart, to execute a basic input/output software; to retrieve by the basic input/output software the present power profile in the non-volatile memory; and to apply by the basic input/output software power to the system resources through the hardware hook based on the present power profile, wherein the basic input/output software applies power to the system resources by setting a set of control bits in the hardware hook.

21. The data processing system of claim 17, wherein the processor executing the computer readable program code to update the present power profile in the non-volatile memory further comprises the processor executing the computer readable program code:
to update the present power profile in the non-volatile memory, wherein the non-volatile memory is selected from a group consisting of erasable programmable read-only memory, electrically erasable programmable read-only memory, FLASH memory, ferroelectric random access memory, magnetoresistive random access memory, programmable metallization cells, carbon nanotube memory, and combinations thereof.

22. The data processing system of claim 17, wherein the processor further executes the computer readable program code:
to issue a system management interrupt by a control software; and responsive to issuing the system management interrupt, to update the present power profile in the non-volatile memory to correspond to the power profile for the application to be executed.

23. The data processing system of claim 22, wherein the processor executing the computer readable program code to issue the system management interrupt by the control software further comprises the processor executing the computer readable program code:
to issue the system management interrupt by the control software, wherein the control software is the application to be executed after the system restart.

24. The data processing system of claim 17, wherein the processor executing the computer readable program code to apply power to system resources through a hardware hook based on the present power profile further comprises the processor executing the computer readable program code:
to apply power to the system resources through the hardware hook based on the present power profile, wherein the hardware hook is selected from a group consisting of a microcontroller, a staggered pin grid array, and an integrated circuit.

* * * * *